United States Patent
Aghoram Ravichandran et al.

(10) Patent No.: US 11,429,813 B1
(45) Date of Patent: Aug. 30, 2022

(54) AUTOMATED MODEL SELECTION FOR NETWORK-BASED IMAGE RECOGNITION SERVICE

(71) Applicant: Amazon Technologies, Inc., Seattle, WA (US)

(72) Inventors: Avinash Aghoram Ravichandran, Shoreline, WA (US); Rahul Bhotika, Bellevue, WA (US); Stefano Soatto, Pasadena, CA (US); Pietro Perona, Altadena, CA (US); Hao Yang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 336 days.

(21) Appl. No.: 16/697,662

(22) Filed: Nov. 27, 2019

(51) Int. Cl.
*G06K 9/62* (2022.01)
*G06N 20/00* (2019.01)

(52) U.S. Cl.
CPC ......... *G06K 9/6262* (2013.01); *G06K 9/6256* (2013.01); *G06N 20/00* (2019.01)

(58) Field of Classification Search
CPC .................. G06K 9/6262–6265; G06N 20/00
See application file for complete search history.

(56) References Cited

U.S. PATENT DOCUMENTS

| | | | | |
|---|---|---|---|---|
| 10,474,926 B1* | 11/2019 | Dirac | ............... | G06K 9/6227 |
| 10,540,608 B1* | 1/2020 | Dirac | ............... | G06N 20/00 |
| 2017/0061329 A1* | 3/2017 | Kobayashi | ......... | G06N 20/00 |
| 2018/0129959 A1* | 5/2018 | Gustafson | ......... | G06N 5/022 |
| 2020/0042829 A1* | 2/2020 | Wang | ............... | G06K 9/6257 |
| 2020/0202171 A1* | 6/2020 | Hughes | ............... | G06N 7/005 |
| 2021/0312235 A1* | 10/2021 | Tsuchiya | ............ | G06N 20/00 |

* cited by examiner

*Primary Examiner* — Wen W Huang
(74) *Attorney, Agent, or Firm* — Lee & Hayes, P.C.

(57) ABSTRACT

This disclosure describes automatically selecting and training one or more models for image recognition based upon training and testing (validation) data provided by a user. A service provider network includes a recognition service that may use models to process images and videos to recognize objects in the images and videos, features on the objects in the images and videos, and/or locate objects in the images and videos. The service provider network also includes a model selection and training service that may select one or more modeling techniques based on the objectives of the user and/or the amount of data provided by the user. Based on the selected modeling technique, the model selection and training service selects and trains one or more models for use by the recognition service to process images and videos using the training data. The trained model may be tested and validated using the testing data.

20 Claims, 10 Drawing Sheets

AUTOMATED MODEL SELECTION FOR NETWORK-BASED IMAGE RECOGNITION SERVICE

BACKGROUND

Service providers offer cloud-based services via service provider networks to fulfill user's computing-service needs without the users having to invest in and maintain computing infrastructure required to implement the services. These service providers may provide network-based computing resources and functionality to implement various types of cloud-based services, such as, for example, scalable-storage services, computer-processing services, and so forth. In some examples, developers may utilize services offered by the service provider to run the systems and/or applications using virtual services (or "instances") provisioned on various configurations of hardware-based resources of a cloud-based service.

Another example of a network-based service includes a recognition service. The recognition service may be used to quickly process images or videos provided by users. The recognition service generally uses various techniques and models to process the images and videos in order to identify objects within the images and videos, features of objects within the images and videos, and/or determine locations of objects within the images and videos, etc. The models need to be trained to be able to process images and videos provided by users to identify desired objects, features, locations, etc. However, users are generally interested in different objects and may have varying amounts of data with which to train the models. Furthermore, some users are interested in processing entire images or videos, while other users are interested in processing sub images and sub videos, e.g., various regions of images and videos. Thus, selecting and training one or more appropriate models for each user can be a difficult and time consuming process.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
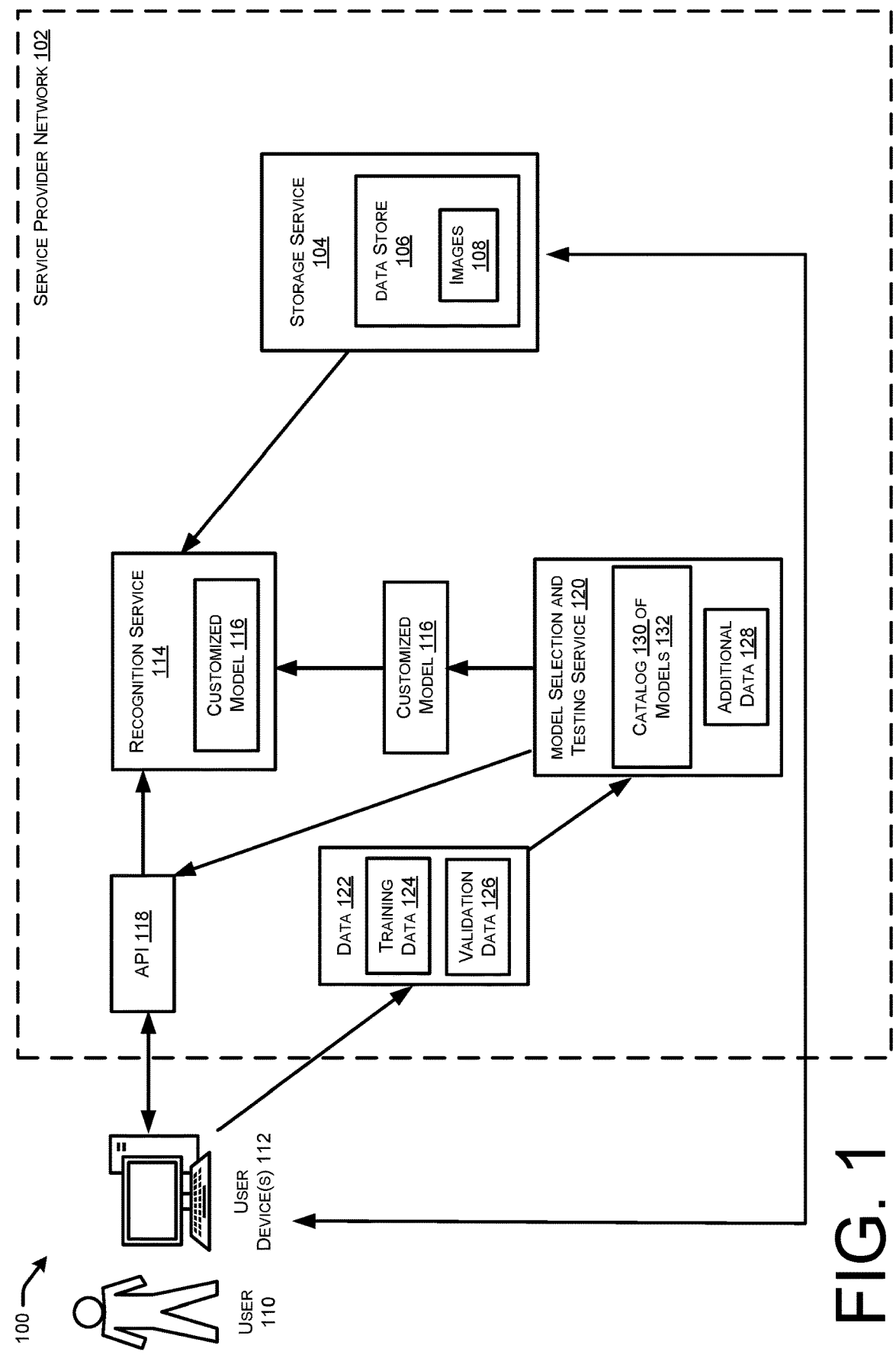
FIG. 1 schematically illustrates a system-architecture diagram of an example environment that includes an example service provider network that includes services that automatically select a model and train the model for use by a recognition service of the service provider to identify and/or locate objects in images.

This disclosure describes, at least in part, techniques and architecture for automatically selecting and training one or more models for image recognition based upon training and testing (validation) data provided by a user. For example, in accordance with various configurations, a service provider network may include a recognition service that may use models to process images and videos to recognize objects in the images and videos, features on the objects in the images and videos, and/or locate objects in the images and videos. The service provider network may also include a model selection and training service that may select one or more modeling techniques. The model selection and training service may also select and train one or more models for use by the recognition service to process images and videos using the training data. The trained model may be tested and validated using the testing data. As used herein, when reference is made to "images," it may refer to both stationary images (e.g., photographs) and video images.

In particular, in configurations, the model selection and training service of the service provider network selects and trains one or more models for image recognition based upon training and testing data provided by a user in order to provide a customized model for the user. The model selection and training service also selects and trains one or more models based upon the use case that the user is trying to solve. For example, is the user is attempting to classify (e.g., identify) an object or a feature (single or multi-label, e.g., one or more labels identifying one or more features of an object) in an image, or is the user attempting to localize one or more objects or features, e.g., is the user attempting to determine where within an image an object or feature is located? Based at least in part on the objectives of the user and the amount of data provided by the user, the model selection and training service determines which modeling technique is best for the use case. Additionally, the model selection and training service will determine which model or models are best to use for the selected modeling technique.

In configurations, the model selection and training service includes multiple computer vision techniques and feature-based techniques including both traditional methods as well as multi-stage pipeline models, e.g., deep learning/machine learning (ML) based methods. The various modeling techniques are differently suited for different scenarios.

Examples of modeling techniques that may be used by the model selection and training service include image/instance match. Image/instance match generally is a traditional computer vision based technique that consists of feature extraction, feature descriptor, and indexing. The technique may also include a geometric verification stage, i.e., determining if the configurations of the features in training and testing match. Generally, image/instance match is fairly generic and addresses scenarios where a user brings only a few-shots (a few samples of image data) that are rich with features and generally do not undergo much of a transformation.

Another example of a modeling technique that may be used by the model selection and training service is a deep learning method. The deep learning method extracts features from the image data by using a deep learning method either at the whole image level or at a sub region level of the image. A classifier may be trained on the features for the classes of interest, e.g., animals, products, logos, landmarks, scenes, etc. The deep learning technique is generally suitable when the user only has a few shots of data and the data generally includes objects that are non-feature rich, e.g., the objects do not include a lot of features. The deep learning method may process the sample data provided by the user and select one or more models from a catalog of available models based upon the analysis provided by the deep learning method.

Another example of a modeling technique that may be used by the model selection and training service is a fine-tuning technique. The fine-tuning technique is a standard transfer learning method where a pre-trained model is continually trained using the data provided by the user for the user's custom task, e.g., the user's project of identifying and/or locating objects and/or features in images. The fine-tuning technique generally involves hyperparameter optimization (HPO) over the catalog of models. Generally, the fine-tuning technique is extremely suitable for scenarios where the user includes large-shot data, e.g., the user provides a large amount of training and/or testing data.

The technique selection by the model selection and training service may be based on heuristics. The heuristics may include, the number of samples provided by the user for training, the use case in which the user is interested, etc.

In configurations, the catalog of models is a collection of models that have been trained on various settings and data. For example, for image/instance match, the model selection and testing service includes a vocabulary based on logos and another vocabulary based on characters. Thus, if the user is attempting to locate a logo within images, e.g., their own logo or a competitor's logo, then that particular vocabulary may be used for the instance match technique. If the user is attempting to identify an object within an image that includes particular characters and/or symbols, then the image/instance match technique may utilize the vocabulary based on characters and symbols.

For the deep learning technique, the catalog of models of the model selection and training service may include multiple models trained on different sets of data. Thus, if the user only provides a small amount of data on which to train the model, then the sets of data may be utilized to augment the data provided by the user for training a selected deep learning model from the catalog of models. For example, if the user wishes to identify if a dog is present within an image but only provides a few sample images that include a dog, then for the deep learning technique, one or more models may be selected that have already been trained on images of dogs. The catalog of models may be modified over time as more data is received and used to train the models, and as more models are developed and trained.

For the fine-tuning technique, based on the data provided by the user and the use class, e.g., types or classes of the objects, a model may be selected from the catalog of models and trained or fine-tuned using the data provided by the user. For example, if the user wishes to locate a product, a logo, landmark scene or other scenario within an image, an appropriate model may be selected from the catalog of models and trained with the sample image data provided by the user. Thus, fine-tuning is generally useful where a user includes a mid-shot to high-shot of image data, e.g., a medium to large amount of image data.

Once the appropriate modeling technique for the model is selected, the model selection and training service may select one or more candidate models for training. In particular, a model may be selected and trained based on similarity between the data set provided by the user and the data set upon which a particular model has been trained. Additionally, based on desired features, visual similarities, etc., a particular model or models may be selected from the catalog of models.

Once the model or models have been selected and trained using the user's data, a top model or models may be selected based on accuracy using the testing (validation) data to test the trained models. Other factors that may be considered in selecting a model may be latency, memory requirements, etc. Once the testing is complete, the results may be presented to the user and an appropriate application programming interface (API) may be provided for the user to access the one or more models within the recognition service provided by the service provider network to process images. When the API is called by the user, the recognition service may obtain the one or more images from a storage service provided by the service provider network and then use the appropriate model to process the images to identify objects, features on objects, and/or locations of objects or features within the images.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 that includes an example service provider network 102. The service provider network 102 may comprise servers (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network 102 may be distributed across one or more physical or virtual devices.

As may be seen in FIG. 1, the service provider network 102 includes a storage service 104. The storage service 104 includes a data store 106 that stores images 108 of a user 110. As previously noted, the images 108 may include stationary images (e.g., photographs) and/or video images. The user 110 may be an individual, a group of individuals, an entity, an organization, a business entity, etc., and may obtain or purchase services via one or more user devices 112, e.g., electronic devices, from an operator of the service provider network 102. The user 110 may provide the images 108 to the data store 106 using the user device 112.

The service provider network 102 also includes a recognition service 114 that uses trained and customized models 116 to identify objects in an image 108, identify features on an object, location of an object within an image, etc. Thus, the user 110 may utilize the user device 112 to call an API 118 in order to access a model 116 that has been customized for the user 110 to process images 108 for objects, features on objects, location of objects, etc. As is known, objects generally refer to a particular person, logo, product, landmark, animal, etc., located within an image 108. Likewise, as is known, features on objects may include, for example, facial features (e.g., nose, eyes, etc.), body features, characters or symbols, parts of a landmark or other type of object, etc.

In order to provide an appropriate customized model 116 (or models) for the user 110 to access in the recognition service 114 for processing images 108, the user 110 may submit a request for a custom project or task for processing images 108 to a model selection and training service 120 of the service provider network 102. The custom project may include one or more of identifying particular objects in images 108, identifying features on objects in images 108, locations of objects within images 108, etc. The model selection and training service includes a includes a catalog 130 of potential models 132 that may be customized for the user 110 to process images 108 based on the custom project or task. In configurations, the model selection and training service 120 may be part of the recognition service 114.

The user 110 provides data 122 to the model selection and training service 120 of the service provider network 102. The data 122 may be utilized to select an appropriate modeling technique for a type of model 132 (or models). The data 122 may be used to train and customize a selected model 132 from the catalog 130. Thus, the data 122 may include corresponding annotations within images that identify objects or features on objects. The data 122 may include bounding boxes that identify a location of an object or feature of interest on the object by bounding the object or feature of interest within the images in the data 122. The data 122 may be used to train and test the selected model 132 for use by the recognition service 114. Given the large variety of particular use cases for various users, multiple modeling techniques are provided for use by the model selection and training service 120 in order to select and train an appropriate model 132.

Generally, as will be described further herein, the data 122 includes training data 124 and validation data 126 (also referred to herein as testing data). Also, as will be discussed further herein, examples of work flow techniques include, as previously noted, a traditional computer vision based method, generally referred to as image/instance match, which is generally useful to address low shot (e.g., low amount) of data and instance level use-cases. A deep learning or machine learning (ML) method is also useful for low/medium shot and classification/detection use cases. A fine-tuning method is generally geared towards addressing high shot and breadth of use cases.

Figure 2:
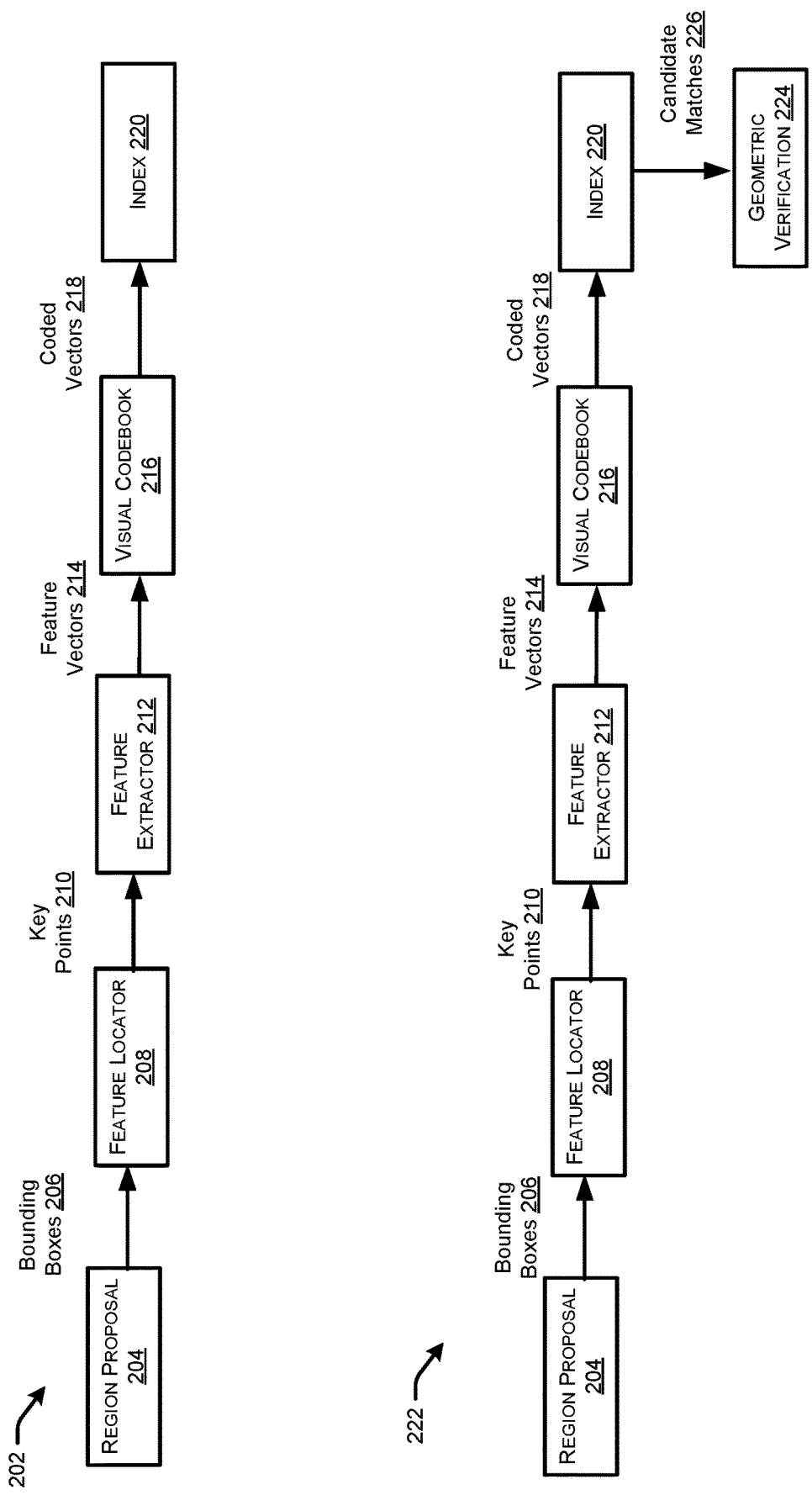
FIGS. 2-4 schematically illustrate example workflows for different modelling techniques for models for identifying and/or locating objects in images.

Referring to FIG. 2, an example 200 of workflows for the instance/image match method for customizing a model 132 into a customized model 116 may be seen. As previously noted, the instance/image match method is a traditional computer vision-based method that matches local patches between images, e.g., matches objects or features of objects among images. A training portion 202 begins with a region proposal 204 within image data that provides bounding boxes 206 that isolate the features of an object (or objects). A feature locator 208 detects features (and their support) within an image within the bounding boxes 206 of the region of the image data. The feature localizer 208 provides key points 210 related localized features to a feature extractor 212, which then extracts descriptors from each feature location. Generally, the feature localizer 208 and feature extractor 212 are pre-defined and thus there is no need for training. The features of objects are generally agnostic to verticals. Verticals are generally another way in which to denote the use-case space such as, for example, products, logos, and characters.

Feature vectors 214 are then provided to a visual codebook 216, which provides coded vectors 218 to an index 220. The index 220 next provides a list of the various features in which the user 110 is interested within images or videos. Thus, the training portion of the data 122 provided by the user may be utilized to provide the index 220.

As is known, local patch-based matching may result in false positives. Thus, in configurations, when testing the instance/image match model at 222, a geometric verification (GV) post processing step 224 may be added to ensure that the configuration of patches (candidate matches 226) matched between two images is consistent under a class of geometric transformations. The most common class of geometric transforms are homographies.

Subsequently, the instance/image match method generally works well for planar objects that provide a rich set of well-distributed features. Accordingly, potential use cases for the instance/image match method include, but are not limited to, products (books, DVDs, paintings, wine bottles, etc.), logos, landmarks, and characters. In general, the number of training examples needed may be as little as one image per use case. For example, a single image may be provided in the data 122 that may be used to train the instance/image match model, where the image indicates, using bounding boxes 206, features of the desired image for detection.

Thus, the instance/image match method may work well with very few samples, e.g., small amounts of image data 122, and across multiple domains, e.g., catalog versus in the wild images, cell phone images versus DSLR images, 4K versus webcam footage, etc. Additionally, the instance/image match method is robust to clutter when target objects are large. However, instance/image match generally requires at least four good patch matches within an object. This is generally available when there are rich textures and corners in images. Hence, the instance/image match method may not work for products that have no texture, e.g., solid colored objects, shiny objects, or logos that do not have many corners. Additionally, for smaller objects, there may need to be an additional localization step within the work flow to ensure better quality patch matches. The geometric verification 224 may be utilized based upon the textures and corners.

For each custom project created by the user 110, the workflow 202 for training includes, for every image included within the data 122, multiple features being extracted by the feature extractor 212 to create an inverse document frequency table. The table is generally the equivalent of training the instance/image match model and thus, the table generally corresponds to the index 220. As previously noted, the feature extraction step may be preceded by a localization step by the feature localizer 208 (e.g., an object specific region proposal to restrict the feature extraction to a sub region of the image). During the testing portion 222 of the workflow, the same process as training portion 202 is repeated using a query/test image included within the data 122 from the user 110. Then each feature from the test image is matched with the search index 220, creating a list of candidate matches of the desired image to be located. Geometric verification 224 may then be performed for each candidate to re-rank the final matches based on various factors, e.g., accuracy, latency, memory requirements, etc.

In configurations, the region proposal 204, feature localizer 208, feature extractor 212, visual codebook 216, and geometric verification 224 are shared components of the instance/image match method, e.g., the components may be used or shared among multiple users 110. Additionally, the instance/image match method may be run in a central processing unit (CPU) if needed and the compute complexity is generally less compared to deep learning methods. For smaller projects, the entire search database, e.g., the index 220, may be loaded into memory. Larger projects may require a simulation interoperability database (SIDB) and distributed search and match implementation. The index 220 is generally a project specific component pertinent to the specific or custom project for the user 110.

Figure 3:
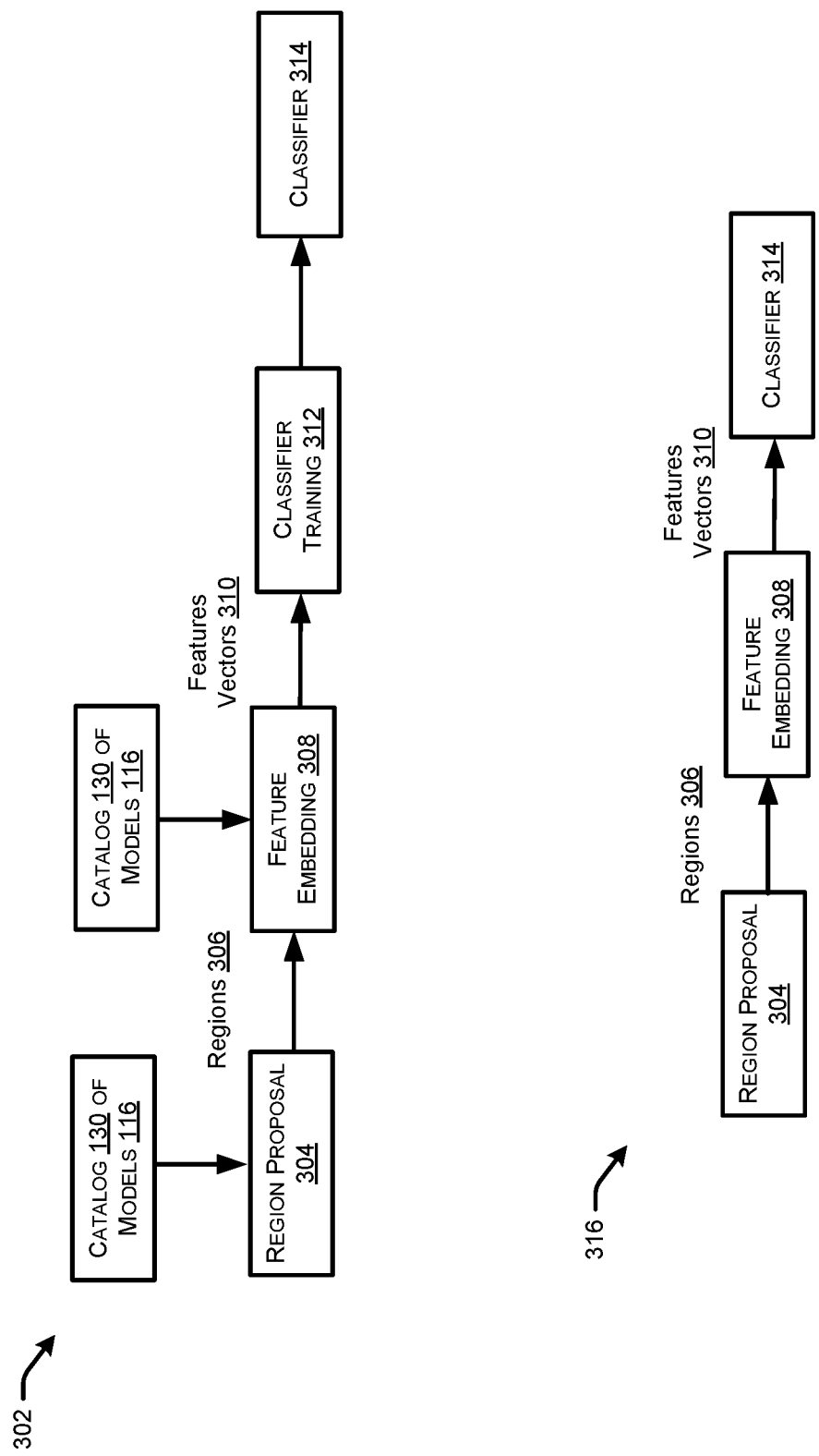

Referring to FIG. 3, an example of workflows for a deep learning method for customizing a model 132 into a customized model 116 may be seen. The deep learning method may be especially useful for addressing long tail distribution of classes, as will be described further herein. In such scenarios, it is generally assumed that the data availability for the desired classes of objects or features is also long tail distributed. Hence, addressing the issue of few-shots of image data 122 (e.g., few samples per use class paradigm) is important. Thus, in configurations, additional data 128 (illustrated in FIG. 1) stored by the model selection and testing service 120 from other projects for other users may be utilized to augment the training data of data 122 provided by the user 110. In configurations, the augmentation occurs at a vertical level by training open universe models. Open universe generally refers to the premise of having a growing number of classes as opposed to a closed universe, which only has a fixed set of classes. The open universe models are vertical specific due to a localization requirement.

One or more models 132 may be selected from the catalog 130 of models 132. In configurations, a three-part approach may be taken. A first part includes a first stage in the form of a region proposal generation network 302 that generates localization proposals in the form of regions 306. A second part includes a second stage in the form of a feature embedding network 308 that extracts features in the form of features vectors 310 from the localization proposals. The third part includes a third stage in the form of classifier training 312 that trains a classifier 314 based on the features.

The potential use cases that are especially suitable for using a deep learning method include, for example, logos, characters, and any domain of choice. However, fine grained classification may be a challenge when using the deep learning method. In configurations, the number of training examples, e.g., samples of image data 122, needed may be in the tens of samples per class. This is due to the use of the additional data 128 by the model selection and training service 120 from other projects.

Advantages of using the deep learning method include the fact that a lightweight data requirement (e.g., light amount of data 122) for each user project is all that is needed. Consequently, this allows for fast prototyping of a selected model 132. Additionally, the compute time at project training is much less than a fine-tuning method. Also, the deep learning method does not include a limitation on what each class should contain (as long as the classes are in the same vertical).

The final customized models 116 of the deep learning technique are thus generally lightweight with respect to the amount of training and validation data required from the user 110. This is generally due to most of the components in FIG. 3 being shared across various user projects. Additionally, the model 116 used is a support vector machine (SVM). Also, for the scenarios where the data 122 includes a "medium" amount of data, e.g., medium-shot cases, the region proposal node 304, as well as the feature embedding node 308, may be fine-tuned to further boost the performance of the final model 116 selected for the user 110.

As can be seen in FIG. 3, for training at 302, proposals from each image of the training data portion of the data 122 are extracted and subsampled based on their overlap with the bounding boxes 306. Features are then extracted from the proposals by the feature embedding node 308 and the SVM is then trained based on these features. For testing at 316, proposals are generated by the region proposal node 304, re-ranked, and features are calculated by the feature embedding node 308 from the bounding boxes 306 and run through the classifier 314.

Thus, with the deep learning method, for training, every supported vertical requires a large data set to train both the region proposal and embedding nodes 304, 308. This includes annotation of features at the bounding box level. Furthermore, to provide high performance, the domains in which the final use cases may exist (e.g., mobile images, DLSR images, 4 k video, etc.) need to be covered. Thus, a lot of data is required and thus the need for augmenting the user data 122 with the additional data 128. For testing of the final model 116, sufficient use cases to test end-to-end workflow for each vertical with varying number of training images (ten to 100 plus) and classes (two to 1000) may be needed. In configurations, different levels of granularity such as fine grained (e.g., different types of guitars), coarse grained (e.g., different logos), and mixed grained (e.g., apple varieties versus other fruits) may be tested.

Figure 4:
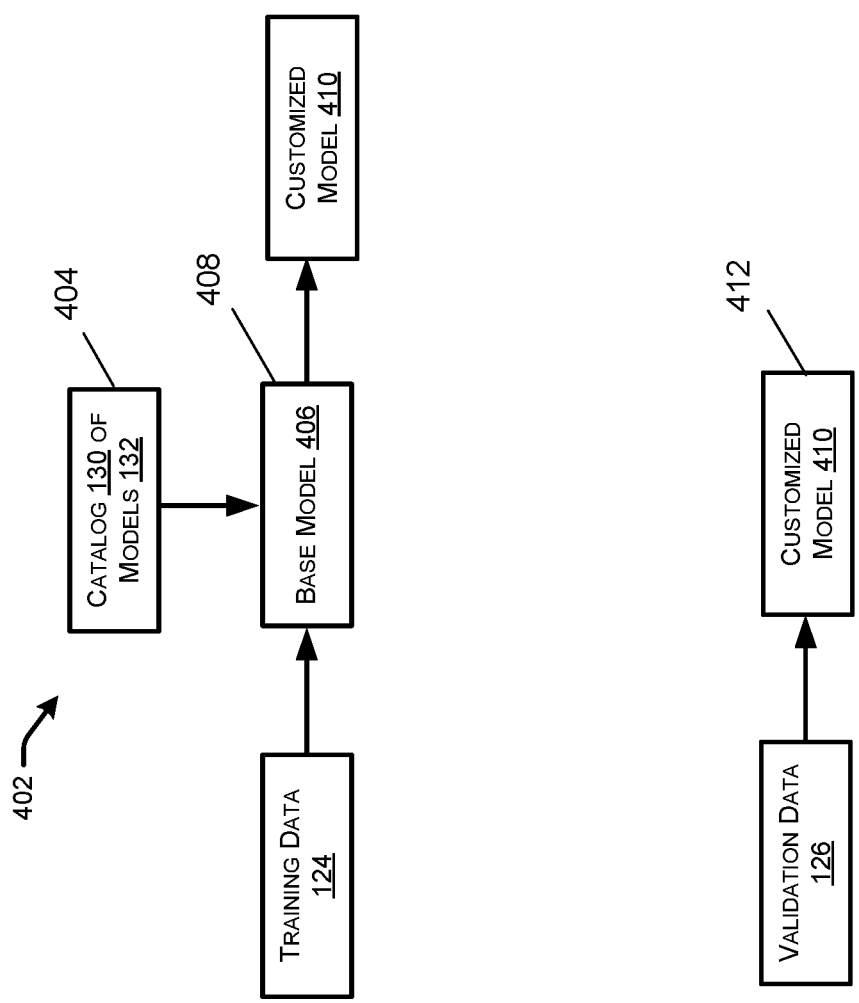

Referring to FIG. 4, an example 400 of for a fine-tuning method for customizing a model 116 into a customized model 132 may be seen. In general, fine-tuning may be similar to training a network. However, the network is initialized with a well-trained model. Thus, the network has a similar computational complexity of training. However, the time taken for convergence to a reasonable solution may be shorter (e.g., hours as opposed to days). There are generally three types of networks that may be fine-tuned. For example, the three types of networks may include classification, classification with multiple labels, and localization.

If explicit bounding box outputs are not needed, multi-label models may solve pseudo localization issues (e.g., using a current classification model that includes labels at the image recognition service 114). Thus, a single based model 132 may be fine-tuned for any use case to provide a customized model 116. However, there may be implications on the hyperparameter search. Thus, the time to fine-tune the models may be affected. Furthermore, with different domains or verticals, the further the process is started from the training data of data 122, the longer it will take to achieve a reasonable performance. Thus, existing models are provided in the catalog 130 of models 132. The catalog 130 of models 132 generally contains different models 132 that have either been previously trained on different verticals or different domains of use cases. Thus, the fine-tuning method involves selecting a model 132 from the catalog 130 of models 132 and then fine-tuning the selected model 132 with the training data 124 provided by the user 110 in data 122. Thus, the fine-tuning method is generally very useful with high-shot cases, e.g., when there is a large amount of training data in the data 122. However, in configurations, models 132 selected from the catalog 130 of models 132 may be fine-tuned even in mid-shot cases.

The fine-tuning method is generally useful when the user 110 desires to locate and/or classify products, logos, landmarks, scenes, etc. Generally, hundreds of samples per class of object are generally provided by the user 110 and the data 122. However, mid-shot scenarios, e.g., fifty to one hundred samples per class, may also use the fine-tuning method.

An advantage of using the fine-tuning method is that the model domain (e.g., video versus cellphone pictures) may be based on the customer's use case. This results in a higher performance as there is no domain gap. A second advantage may include that the model selection and training service 120 may not be limited by the contents of the project of the user 110. The fine-tuning method may be used for projects where the project includes mixed verticals (symbols and logos, products and logos, etc.) and projects in verticals for which there are no pretrained models (at the cost of a higher compute and most likely some performance drop). Additionally, versioning and hosting of a final customized model 116 by the recognition service 114 may be simple. Versioning generally refers to updating of models 116. Finally, the final model 116 selected for the user 110 may be a single model 116 and may not necessarily include multiple steps.

The fine-tuning method generally requires the most amount of training data when compared to the instance/image match method and the deep learning method. This may be an issue in some verticals (e.g., logos).

Accordingly, for the fine-tuning method, for training 402, the catalog 130 of models 132 is provided at 404. A base model 406 from the catalog is then selected at 408. The base model 406 may then be fine-tuned using either a fixed optimization strategy or an adaptive strategy. Validation accuracy of the base model 406 is monitored throughout the training process 402 and the training process 402 may be stopped when the base model 406 shows signs of over fitting. The training process 402 may be repeated multiple times for different choices of hyperparameters and the best model is generally the one that has the lowest validation error rate.

Thus, for training, large training data sets 124 from the data 122 are used to train the selected base model 406 to provide a customized model 410, e.g., customized model 116. Other models 132 may be selected if the base model 406 is not validated properly during the training process 402. Once a model 132 has been selected as the base model 406 and properly validated during the training process 402, the customized model 410 may be tested at 412 using the training data 126. The testing may occur using use-cases to test end-to-end workflow for each vertical with varying number of training images (generally more than 100) from the data 122 and classes (two-one thousand). In configurations, different levels of granularity such as fine grained (e.g., different types of guitars), coarse grained (e.g., different logos), and mixed grained (e.g., apple varieties versus other fruits) may be tested.

Once a model 132 has been selected, trained and validated using the various modeling techniques described herein to provide the customized model 116, an API 118 may be provided to the user 110. The API 118 may be used by the user 110 via the user device 112 to call the customized model 116 at the recognition service 114 to process images 108. The images 108 may be retrieved by the recognition service 114 from the data store 106 of the storage service 104. In configurations, the images 108 may be provided by the user 110 via the user device 112 directly to the recognition service 114.

Data 122 received from the user 110 may have various distributions. A long tail distribution of the data indicates that for certain objects (and hence corresponding use classes for the objects) there are more data points provided in the data 122 while for other features or objects, and thus corresponding use cases, there are fewer data point. Thus, if the data 122 provided by the user 110 in training and testing models has a long tail distribution, then the model selection and training service 120 may normalize the data 122.

If, on the other hand, the distribution of the data 122 has a uniform distribution, then the data 122 may be used for training and testing of models 132 and may be useful in determining which technique for a particular model 132 should be selected by the model selection and training service 120. For example, if the amount of data 122 is high-shot such that the amount of data 122 is greater than N u, e.g., greater than 100 data points then the fine-tuning technique and a corresponding model may be selected by the model selection and training service 120. However, if the amount of data 122 is low-shot, e.g., the amount of data 122 is less than a threshold N 1, e.g., less than 10 data points, then the instance/image match technique and a corresponding model may be selected by the model selection and training service 120. Likewise, if the amount of data 122 is low-shot, the deep learning technique and a corresponding model may be selected by the model selection and training service 120 and the data 122 may be supplemented or augmented with additional data 128 by the model selection and training service 120. For mid-shot data, e.g., the amount of data 122 is between the upper bound N u and the lower bound N 1, then various techniques and models may be selected. Other factors for consideration in selecting a modeling technique and corresponding model 132 may include the granularity of scenarios. For example, a coarse grained scenario may include identifying dogs vs, cats. A mixed grain scenario may include identifying multiple breeds of dogs. A fine grained scenario identifying different types of dresses or guitars. An instance scenario may include a specific brand of cereal or type of widget.

In configurations, it may be determined if the data 122 includes both a training set of data 124 and a validation set of data 126. If the data 122 received from the user 110 does not include a validation set of data 126, then the data 122 provided by the user 110 may be split into a training data set and a validation data set.

In some configurations, it may be determined if the data 122 includes both a training set of data 124 and a validation set of data 126. If the data 122 received from the user 110 does not include a validation set, then the user 110 may be asked for more data 122, e.g., validation data 126 or both validation data 126 and more training data 124.

Figure 5:
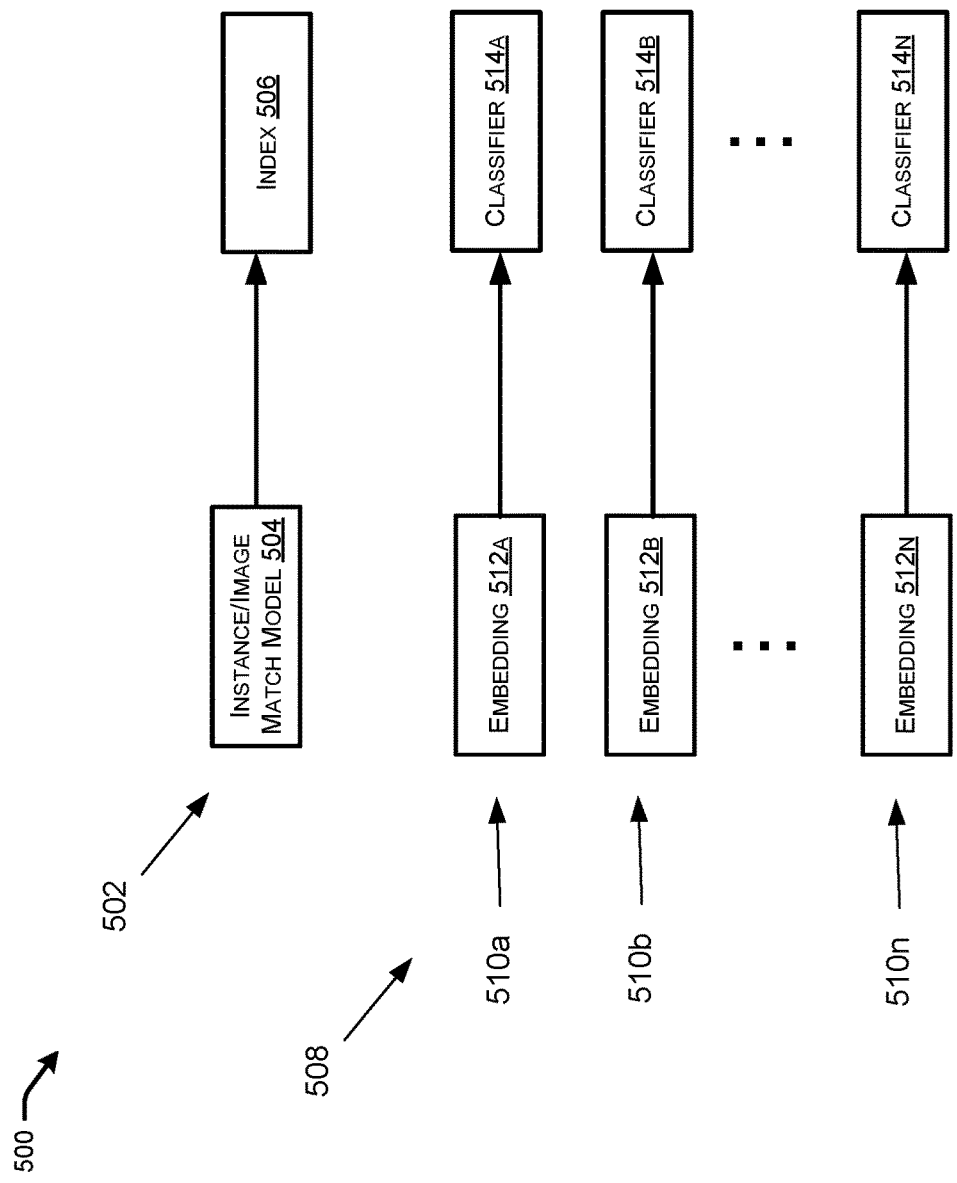
FIG. 5 schematically illustrates an example of a two-stage pipeline, e.g., training two models in parallel.

FIG. 5 schematically illustrates an example of a two-stage pipeline 500, e.g., running two models in parallel. In a first portion 502 of the pipeline 500, an instance/image match model 504 may be executed to create an index 506, e.g., index 220, as previously described. In a second portion 508 of the pipeline 500, one or more deep learning models 510a-510n may be executed. The deep learning models 510a-510n may execute multiple embedding portions 512a-512n in parallel, e.g., feature embedding portion 308, to create classifiers 514a-514n, e.g., classifiers 314. Upon completion of the instance/image match model 504 and deep learning models 510a-510n, a post selection step may be performed in which one or more of models 504 and 510a-510n are selected for use by the user 110 in the image recognition service 114. The selection may be based, for example, on accuracy (e.g., error rate), latency, memory requirements, etc. One or more APIs 118 may be provided to the user 110 for calling multiple models. For example, the instance/image match model 504 may be used by the user 110 to process images 108 with respect to one or more first use classes and the deep learning model 510a may be used by the user 110 to process images 108 with respect to one or more second use classes. In configurations, the instance/image match model 504 may be used to help validate, e.g., confirm accuracy, of the deep learning models 510*a*-510*n*.

Execution of the instance/image match model can pair well with execution of the fine-tuning models and/or the deep learning models and may be especially useful in validating the best models for use by the user 110 with the image recognition service 114. In general, the instance/image match model is cheaper and less resource-intensive than the deep learning models and/or the fine-tuning models.

Figure 6:
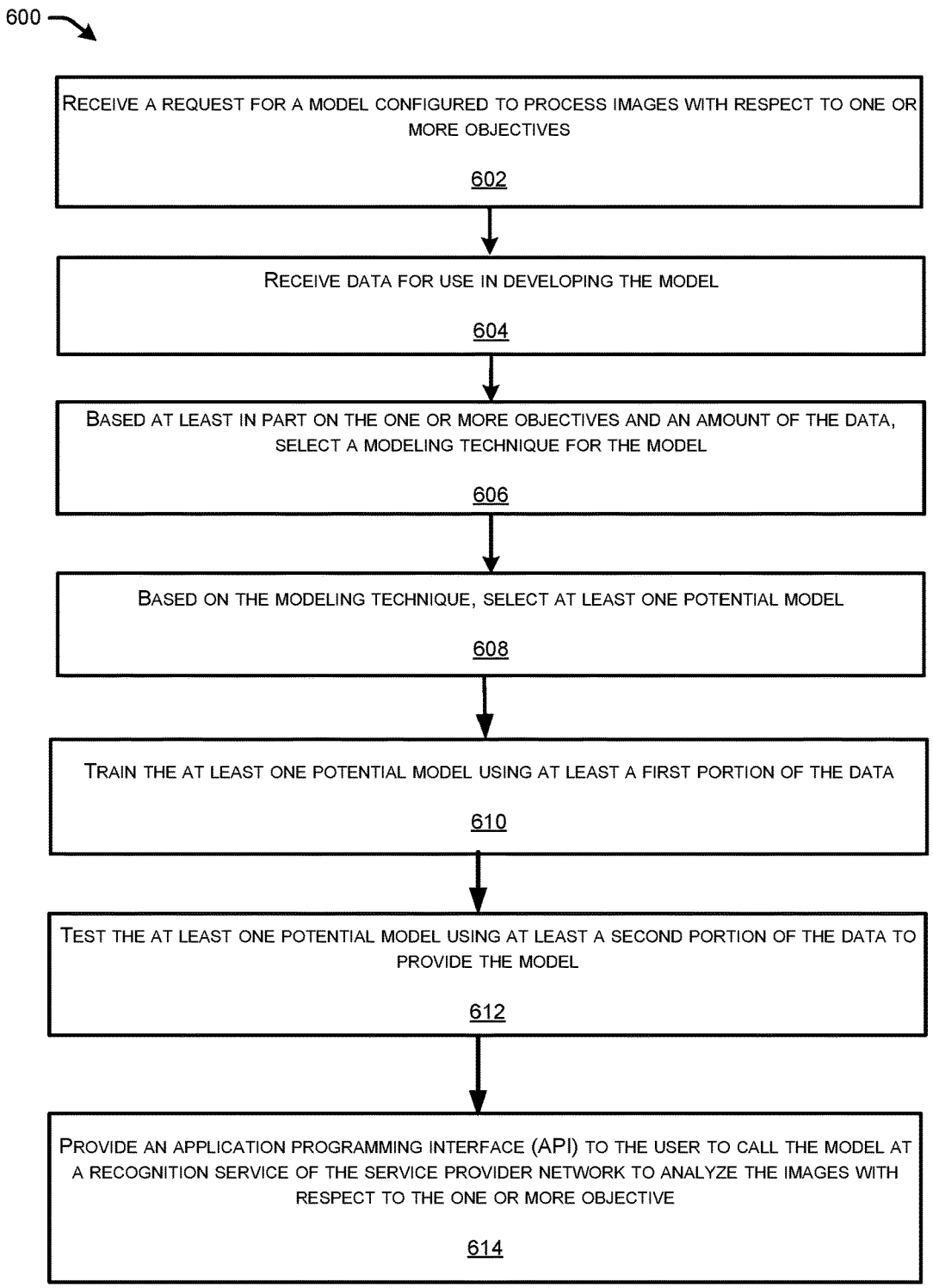
FIG. 6 is a flow diagram of an example method for automatically selecting and training models for image recognition within a network.

FIG. 6 illustrates a flow diagram of an example method 600 that illustrates aspects of the functions performed at least partly by the services as described in FIGS. 1-5. The logical operations described herein with respect to FIG. 6 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 6, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 6 illustrates a flow diagram of the example method 600 for automatically selecting and training models for image recognition within a network. At 602, a request is received for a model configured to process images with respect to one or more objectives. The objectives may include (i) classification of one or more of (a) objects or (b) features of objects in the images or (ii) localization of one or more of (c) objects or (d) features of objects in the images. For example, the request may be received from a user, e.g., user 110, by a model selection and training service, e.g., model and selection service/120, of a service provider network, e.g., service provider network 102.

At 604, data for use in developing the model is received. For example, the data, e.g., data 122, may be received from the user by the model selection and training service. The data may include training data, e.g., training data 124, and validation data, e.g., validation data 126. At 606, based at least in part on the one or more objectives and an amount of the data, a modeling technique is selected for the model. For example, instance/image match, deep learning, and/or fine-tuning may be selected.

At 608, based on the modeling technique, at least one potential model is selected. For example, a potential model 132 may be selected from the catalog of models 132. In configurations, multiple potential models may be selected and the multiple potential models may or may not be based on different modelling techniques. At 610, the at least one potential model is trained using at least a first portion of the data. For example, the at least one potential model may be trained using training data 124 of the data 122. At 612, the at least one potential model is tested using at least a second portion of the data to provide the model. For example, the at least one potential model may be tested using validation data 126 of the data 122.

At 614, an application programming interface (API) may be provided to the user to call the model at a recognition service of the service provider network to process the images with respect to the one or more objectives. For example, the model selection and testing service 120 may provide an API 118 to the user 110 to call the trained and validated model 116 at the recognition service 114 to process images 108. In configurations, the images 108 may be stored at the storage service 104 in the data store 106. The recognition service 114 may retrieve the images 108 from the data store 106. In configurations, the images 108 may be provided directly to the recognition service 114.

Accordingly, the techniques and architecture described herein allow for automatically selecting and training one or more models for image recognition based upon training and testing (validation) data provided by a user. For example, in accordance with various configurations, a service provider network may include a recognition service that may use models to process images and videos to recognize objects in the images and videos, features on the objects in the images and videos, and/or locate objects in the images and videos. The service provider network may also include a model selection and training service that may select one or more modeling techniques. The model selection and training service may also select and train one or more models for use by the recognition service to process images and videos using the training data. The trained model may be tested and validated using the testing data. This may allow for more quickly and efficiently selecting and training models for image analysis for custom projects for users. By more quickly selecting and training models, fewer resources may be used and fewer errors may be realized.

Figure 7:
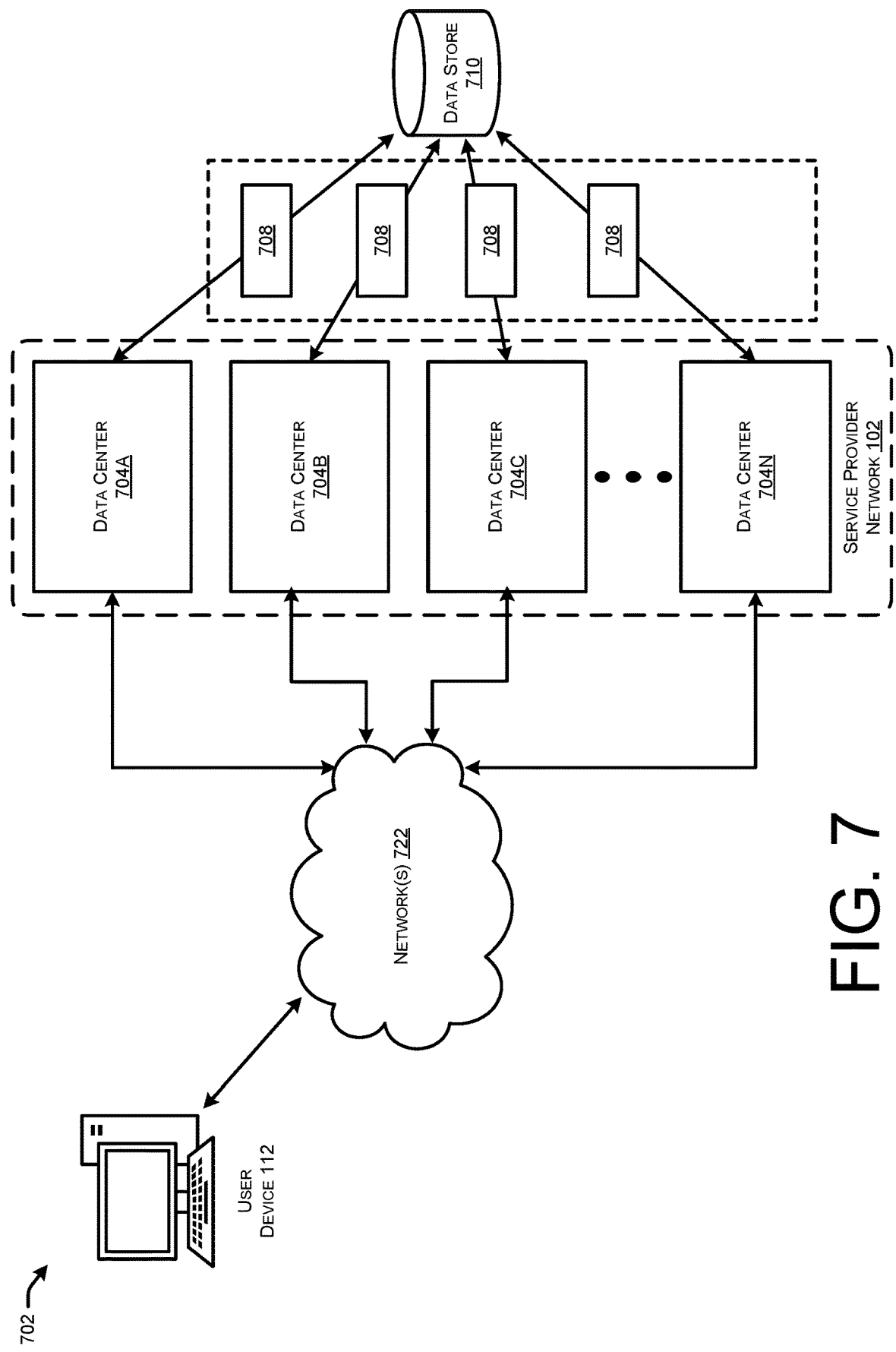
FIG. 7 is a system and network diagram that shows an illustrative operating environment that includes a service provider network that can be configured to implement aspects of the functionality described herein.

FIG. 7 is a system and network diagram that shows one illustrative operating environment 702 for the configurations disclosed herein that includes a service provider network 102 that can be configured to perform the techniques disclosed herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include the recognition service 114 and the model selection and training service 120, on a permanent or an as-needed basis.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative embodiment for a data center 704 that can be utilized to implement the technologies disclosed herein will be described below with regard to FIG. 8.

The data centers 704 may be configured in different arrangements depending on the service provider network 102. For example, one or more data centers 704 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The customers and other users 110 of the service provider network 102 may access the computing resources provided by the service provider network 102 over any wired and/or wireless network(s) 722, which can be a wide area communication network ("WAN"), such as the Internet, an intranet or an Internet service provider ("ISP") network or a combination of such networks. For example, and without limitation, a user device 112 operated by a customer or other user 110 of the cloud-based service provider network 102 may be utilized to access the service provider network 102 by way of the network(s) 722. It should be appreciated that a local-area network ("LAN"), the Internet, or any other networking topology known in the art that connects the data centers 704 to remote customers and other users can be utilized. It should also be appreciated that combinations of such networks can also be utilized.

Each of the data centers 704 may include computing devices that include software, such as applications that receive and transmit data 708, e.g., data 122, additional data 128 and/or data representing images 108. For instance, the computing devices included in the data centers 704 may include software components which transmit, retrieve, receive, or otherwise provide or obtain the data 708 from a data store 710, e.g., data store 106, that may be provided by the storage service 104. For example, the data centers 704 may include or store the data store 710, which may include the data 708.

Figure 8:
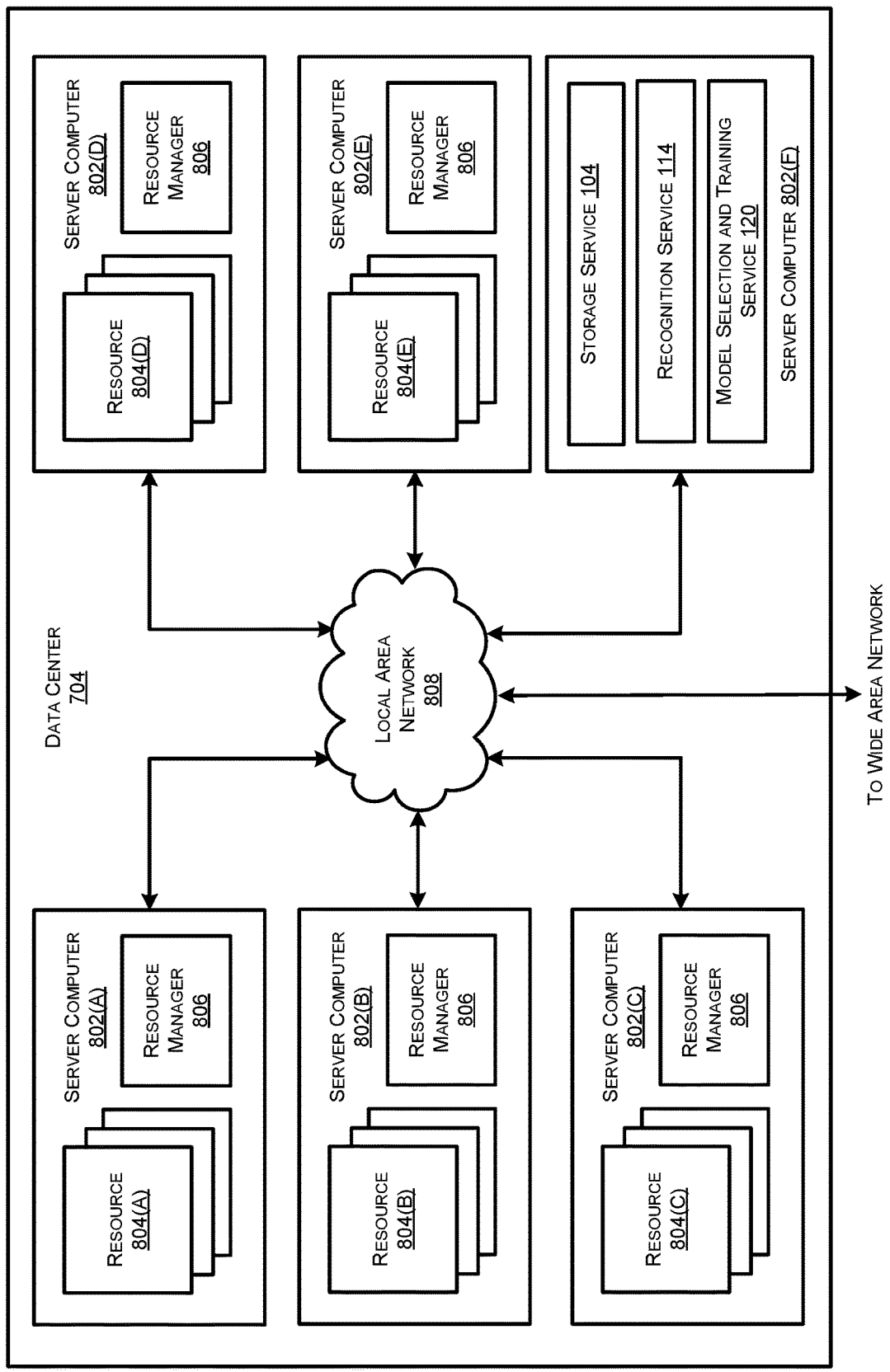
FIG. 8 is a computing system diagram illustrating a configuration for a data center that can be utilized to implement aspects of the technologies disclosed herein.

FIG. 8 is a computing system diagram that illustrates one configuration for a data center 704 that implements aspects of the technologies disclosed herein. The example data center 704 shown in FIG. 8 includes several server computers 802A-802F (which might be referred to herein singularly as "a server computer 802" or in the plural as "the server computers 802") for providing computing resources 804A-804E.

The server computers 802 can be standard tower, rack-mount, or blade server computers configured appropriately for providing the computing resources described herein (illustrated in FIG. 8 as the computing resources 804A-804E). As mentioned above, the computing resources provided by the service provider network 102 can be data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 704 can also be configured to provide network services and other types of services, some of which are described in detail below with regard to FIG. 8.

The data center 704 shown in FIG. 8 also includes a server computer 802F that can execute some or all of the software components described above. For example, and without limitation, the server computer 802F can be configured to execute components of the service provider network 102, including the storage service 104, the recognition service 114, the model selection and training service 120, and/or the other software components described above. The server computer 802F can also be configured to execute other components and/or to store data for providing some or all of the functionality described herein. In this regard, it should be appreciated that the services illustrated in FIG. 8 as executing on the server computer 802F can execute on many other physical or virtual servers in the data centers 704 in various embodiments.

In the example data center 704 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704, and, potentially, between computing resources in each of the server computers 802. It should be appreciated that the configuration of the data center 704 described with reference to FIG. 8 is merely illustrative and that other implementations can be utilized.

Figure 9:
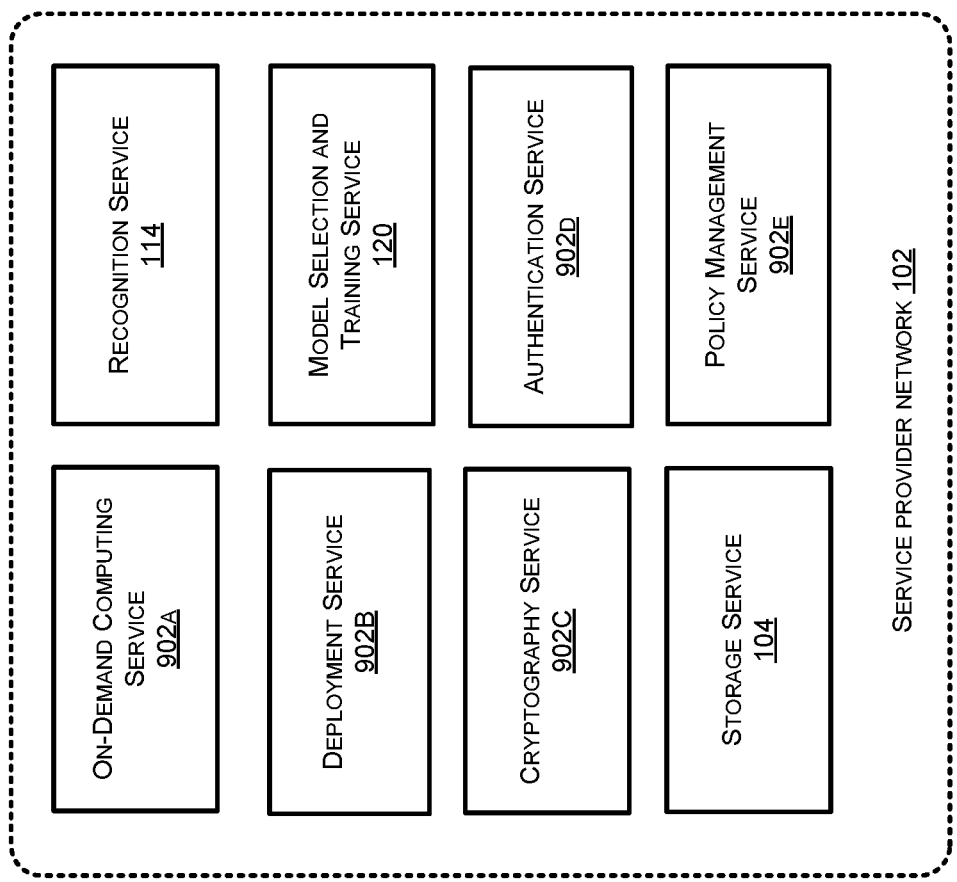
FIG. 9 is a network services diagram that shows aspects of several services that can be provided by and utilized within a system, or a larger system of which the system is a part, which is configured to implement the various technologies disclosed herein.

FIG. 9 is a system and network diagram that shows aspects of several network services that can be provided by and utilized within a service provider network 102 in one embodiment disclosed herein. In particular, and as discussed above, the service provider network 102 can provide a variety of network services to customers and other users of the service provider network 102 including, but not limited to, the recognition service 114, the model selection and training service 120, and the storage service 104. The service provider network 102 can also provide other types of services including, but not limited to, an on-demand computing service 902A, a deployment service 902B, a cryptography service 902C, an authentication service 902D, and/or a policy management service 902E, some of which are described in greater detail below. Additionally, the service-provider network 102 can also provide other services, some of which are also described in greater detail below.

It should be appreciated that customers of the service provider network 102 can include organizations or individuals that utilize some or all of the services provided by the service provider network 102. As described herein, a customer or other user can communicate with the service provider network 102 through a network, such as the network 722 shown in FIG. 7. Communications from a customer computing device, such as the user device 110 shown in FIG. 7, to the service provider network 102 can cause the services provided by the service provider network 102 to operate in accordance with the described configurations or variations thereof.

It is noted that not all embodiments described include the services described with reference to FIG. 9 and that additional services can be provided in addition to or as an alternative to services explicitly described. Each of the services shown in FIG. 9 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 902A to store data in or retrieve data from a storage service). Additional details regarding some of the services shown in FIG. 9 will now be provided.

As discussed above, the on-demand computing service 902A (can be a collection of computing resources configured to instantiate VM instances and to provide other types of computing resources on demand. For example, a customer or other user of the service provider network 102 can interact with the on-demand computing service 902A (via appropriately configured and authenticated network services API calls) to provision and operate VM instances that are instantiated on physical computing devices hosted and operated by the service provider network 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 902A is shown in FIG. 9, any other computer system or computer system service can be utilized in the service provider network 102, such as a computer system or computer system service that does not employ virtualization and instead provisions computing resources on dedicated or shared computers/servers and/or other physical devices.

The service provider network 102 can also include a cryptography service 902C. The cryptography service 902C can utilize storage services of the service provider network 102, such as the storage service 104, to store encryption keys in encrypted form, whereby the keys are usable to decrypt customer keys accessible only to particular devices of the cryptography service 902C. The cryptography service 902C can also provide other types of functionality not specifically mentioned herein.

As illustrated in FIG. 9, the service provider network 102, in various embodiments, also includes an authentication service 902D and a policy management service 902E. The authentication service 902D, in one example, is a computer system (i.e., collection of computing resources) configured to perform operations involved in authentication of users. For instance, one of the services 902 shown in FIG. 9 can provide information from a user to the authentication service 902D to receive information in return that indicates whether or not the requests submitted by the user are authentic.

The policy management service 902E, in one example, is a network service configured to manage policies on behalf of customers or internal users of the service provider network 102. The policy management service 902E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 102 can additionally maintain other services 902 based, at least in part, on the needs of its customers. For instance, the service provider network 102 can maintain a deployment service 902B for deploying program code and/or a data warehouse service in some embodiments. Other services can include object-level archival data storage services, database services, and services that manage, monitor, interact with, or support other services. The service provider network 102 can also be configured with other services not specifically mentioned herein in other embodiments.

Figure 10:
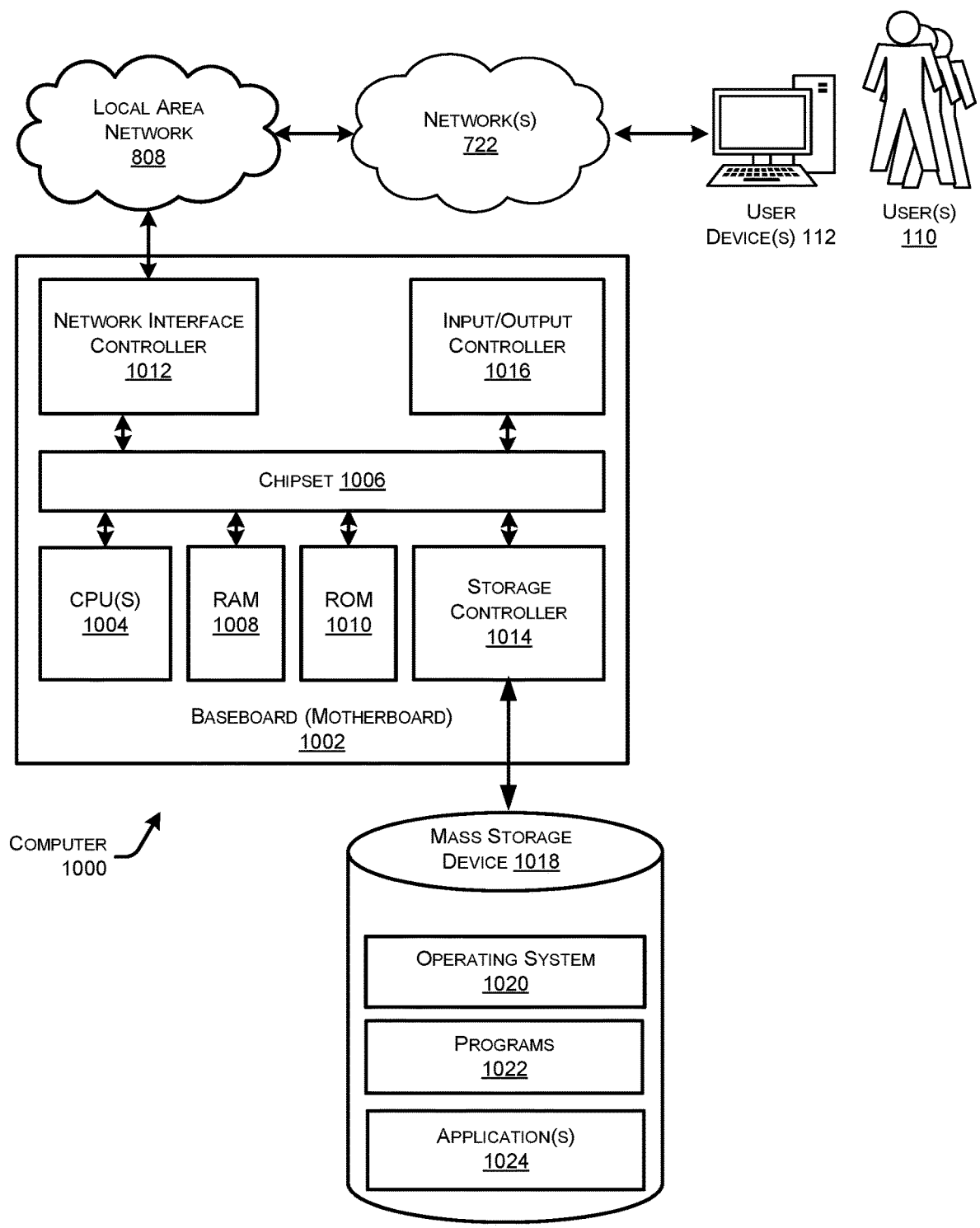
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 808. The chipset 1006 can include functionality for providing network connectivity through a Network Interface Controller (NIC) 1012, such as a gigabit Ethernet adapter. The NIC 1012 is capable of connecting the computer 1000 to other computing devices over the network 808 (or 722). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022 (e.g., agents, etc.), data, and/or applications(s) 1024, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 102, and or any components included therein, may be supported by one or more devices similar to computer 1000. Stated otherwise, some or all of the operations performed by the service provider network 102, and or any components included therein, may be performed by one or more computer devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-6. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

The computer 1000 may transmit, receive, retrieve, or otherwise provide and/or obtain data and/or results to and/or from the service provider network 102. The computer 1000 may store the data on the operating system 1020, and/or the programs 1022 that are stored in the mass storage device 1018 to update or otherwise modify the operating system 1020 and/or the programs 1022.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
receiving, from a user by a model selection and training service of a service provider network, a request for a model configured to process images with respect to one or more objectives, the objectives comprising (i) classification of one or more of (a) objects or (b) features of objects in the images or (ii) localization of one or more of (c) objects or (d) features of objects in the images;
receiving training data for use in developing the model;
receiving validation data, wherein at least a portion of the validation data is distinct from the training data;
based at least in part on the one or more objectives and an amount of the training data, selecting a modeling technique for the model;
based on the modeling technique, selecting at least one potential model;
training the at least one potential model using at least a portion of the training data;
testing the at least one potential model using at least the portion of the validation data to provide the model; and
providing, by the model selection and testing service to the user, an application programming interface (API) to call the model at a recognition service of the service provider network to process the images with respect to the one or more objectives.

2. The computer-implemented method of claim 1, wherein the modeling technique comprises one of (i) instance/image match, (ii) multi-stage pipeline, or (iii) fine-tuning.

3. The computer-implemented method of claim 1, wherein the modeling technique is one of multi-stage pipeline or fine-tuning and selecting the at least one potential model comprises selecting the at least one potential model from a catalog of models.

4. The computer-implemented method of claim 1, wherein the modeling technique is a first modeling technique comprising multi-stage pipeline, and the at least one potential model is a first at least one potential model, the method further comprising:
selecting a second modeling technique comprising instance/image match for a second model;
based on the second modeling technique, selecting a second potential model;
training the second potential model using at least the portion of the training data; and
testing the second potential model using at least the portion of the validation data to provide the second model.

5. The computer-implemented method of claim 4, wherein the first model is used by the recognition service to process the images with respect to one or more first use classes and the second model is used by the recognition service to process the images with respect to one or more second use classes.

6. A method comprising:
receiving training data for use in developing a model configured to process images with respect to one or more objectives, the objectives comprising (i) classification of one or more of (a) objects or (b) features of objects in the images or (ii) localization of one or more of (c) objects or (d) features of objects in the images;
receiving validation data, wherein at least a portion of the validation data is distinct from the training data;
based at least in part on at least one of the training data and the validation data, selecting a modeling technique for the model;
based on the modeling technique, selecting at least one potential model;
training the at least one potential model using at least a portion of the training data;
testing the at least one potential model using at least the portion of the validation data to provide the model; and
using the model to process the images with respect to the one or more objectives.

7. The method of claim 6, wherein the modeling technique comprises one of (i) computer vision, (ii) deep learning, or (iii) fine-tuning.

8. The method of claim 6, wherein the modeling technique is one of deep learning or fine-tuning and selecting the at least one potential model comprises selecting the at least one potential model from a catalog of models.

9. The method of claim 6, wherein the modeling technique comprises deep learning and the method further comprises:
providing additional data for use with at least one of the portion of the training data or the portion of the validation data.

10. The method of claim 6, further comprising requesting additional data for the testing of the at least one potential model.

11. The method of claim 6, wherein the modeling technique is a first modeling technique comprising deep learning and the at least one potential model is a first at least one potential model, the method further comprising:
selecting a second modeling technique comprising instance/image match for a second model;
based on the second modeling technique, selecting a second potential model;
training the second potential model using at least the portion of the training data; and
testing the second potential model using at least the portion of the validation data to provide the second model.

12. The method of claim 11, wherein the first model is used to process the images with respect to one or more first use classes and the second model is used to process the images with respect to one or more second use classes.

13. The method of claim 6, wherein the images comprise video images.

14. The method of claim 6, wherein:
the modeling technique comprises a feature-based technique; and
the method further comprises testing the second potential model using at least the portion of the validation data to provide the second model comprises performing geometric verification.

15. One or more computer-readable media storing computer-executable instructions that, when executed, cause one or more processors to perform operations comprising:
receiving training data for use in developing a model configured to process images with respect to one or more objectives, the objectives comprising (i) classification of one or more of (a) objects or (b) features of objects in the images or (ii) localization of one or more of (c) objects or (d) features of objects in the images;
receiving validation data, wherein at least a portion of the validation data is distinct from the training data;

based at least in part on at least one of the training data and the validation data, selecting a modeling technique for the model;

based on the modeling technique, selecting at least one potential model;

training the at least one potential model using at least a portion of the training data;

testing the at least one potential model using at least the portion of the validation data to provide the model; and using the model to process the images with respect to the one or more objectives.

16. The computer-readable media of claim 15, wherein the modeling technique is one of deep learning or fine-tuning and selecting the at least one potential model comprises selecting the at least one potential model from a catalog of models.

17. The computer-readable media of claim 15, wherein the modeling technique comprises deep learning and the operations further comprise:

providing additional data for use with at least one of the portion of the training data or the portion of the validation data.

18. The computer-readable media of claim 15, wherein the modeling technique is a first modeling technique comprising deep learning and the at least one potential model is a first at least one potential model, the operations further comprising:

selecting a second modeling technique comprising instance/image match for a second model;

based on the second modeling technique, selecting a second potential model;

training the second potential model using at least the portion of the training data; and testing the second potential model using at least the portion of the validation data to provide the second model.

19. The computer-readable media of claim 18, wherein the first model is used to process the images with respect to one or more first use classes and the second model is used to process the images with respect to one or more first use classes.

20. The computer-readable media of claim 15, wherein:

the modeling technique comprises feature-based technique; and the operations further comprise testing the second potential model using at least the portion of the validation data to provide the second model comprises performing geometric verification.

* * * * *